US 6,624,240 B2

(12) United States Patent
Auerbach

(10) Patent No.: US 6,624,240 B2
(45) Date of Patent: Sep. 23, 2003

(54) LOW MOLECULAR WEIGHT POLYURETHANE RESINS

(75) Inventor: Robert Auerbach, Princeton Junction, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 10/034,270

(22) Filed: Dec. 28, 2001

(65) Prior Publication Data

US 2003/0158364 A1 Aug. 21, 2003

(51) Int. Cl.[7] ................................................ C08G 18/30
(52) U.S. Cl. ............................ 524/591; 528/49; 528/71; 528/59; 523/160; 523/161; 106/31.25; 106/31.92; 560/25
(58) Field of Search ..................... 528/49, 71; 524/591; 523/160, 161; 106/31.25, 31.92; 560/25

(56) References Cited

U.S. PATENT DOCUMENTS 5,312,865 A * 5/1994 Hoefer et al.
5,637,639 A * 6/1997 Duan et al.
5,656,701 A 8/1997 Miyamoto et al. .......... 525/453

FOREIGN PATENT DOCUMENTS

| JP | 354568 | 12/1991 | ........... C09D/11/10 |
| JP | 317425 | 11/1992 | ............. G03C/5/54 |
| JP | 5287229 A | 11/1993 | ........... C09D/11/10 |
| JP | 7292307 A | 11/1995 | ........... C09D/11/10 |
| JP | 8120205 A | 5/1996 | ........... C09D/11/10 |

* cited by examiner

*Primary Examiner*—Rachel Gorr
(74) *Attorney, Agent, or Firm*—Sidney Persley

(57) ABSTRACT

Disclosed is a polyurethane resin having a number average molecular weight of up to 5,000 which is prepared by reacting a diisocyanate compound with at least one monomer diol compound and optionally a polymer diol compound without a chain extender to form a polymer, wherein the molar ratio of the monomer diol compound over the polymer diol compound when present is above 1 followed by capping the polymer with a terminator.

29 Claims, No Drawings

LOW MOLECULAR WEIGHT POLYURETHANE RESINS

FIELD OF THE INVENTION

This invention relates to low molecular weight polyurethane resins for use in laminating inks displaying high lamination bond strength.

BACKGROUND OF THE INVENTION

With the increasing use of versatile flexible packagings, there has arisen a need to provide high performance printing inks, various coating agents, and adhesives that are applied for decorative, surface protecting, or other purposes. For example, the printing inks for use on plastic films are required to exhibit much better performance than conventional versions in various aspects such as printability, adhesion to various kinds of films, antiblocking properties, and gloss.

Particularly in the food packaging industry, laminated flexible packagings are currently used since direct contact of the contents with inks must be avoided to ensure utmost hygiene while impressing consumers with the high quality of printing. Lamination is carried out by two methods described hereunder: extrusion lamination which comprises printing an ink on various plastic film bases, applying a primer coat on the printed surface as required, and then laminating a molten layer of polyolefin or the like; and adhesive lamination which comprises applying an adhesive to the printed surface, and then laminating a plastic film. Whichever method is adopted, inks to be used on the various kinds of plastic films to be laminated are required to adhere strongly not only to the base film but also to the film to be laminated.

Solvent based inks represent the bulk of the laminating inks consumed for packaging. The main resins used in solvent applications are acrylics, modified acrylics, polyamides, and urethanes. These soluble resins typically wet out and adhere to the film surfaces and laminated structures with superior bonds.

Water based inks are gaining in popularity as a way to reduce organic emissions and retained solvent in food packaging. In water, acrylics, and more recently urethanes, have found utility and are of the solution and latex type. In comparison with solvent based inks, water based inks suffer from wettability, adhesion, and bond strength limitations Japanese Patent Application No. 354568/1991 discloses an aqueous laminating printing ink for use as a binder in an aqueous polyurethane resin containing a polycarbonate diol as a diol component and which was improved in adhesion to various plastic films and peel strength of laminates. Flexible packagings produced by using such aqueous laminating inks can be used to make bags for packaging dry foods.

Japanese Patent Application No. 317425/1992 discloses a method for improving the adhesion to various plastic films and the peel strength of laminates by using, as an ink binder resin, an acrylic copolymer that had functional groups capable of reaction with a hydrazine group or a hydrazide group introduced into the molecule, and hydrazinc compounds as a crosslinking agent, said agent with those functional groups and carbonyl groups that developed on the film surface by subsequent surface treatment. However, compared to inks using polyurethane-base binder resins that can be used and, hence, the printing inks used in this method are poor in pigment dispersability and printability. Furthermore, during storage, the binder resins will crosslink with the crosslinking agents to lower their fluidity and capability for redissolution. As another problem, there is no guarantee for the occurrence of positive crosslinking said agents with the binder resins and the film surface, and this has often caused nonuniformity in adhesion and the peel strength of laminates.

U.S. Pat. No. 5,656,701 discloses polyurethane resins having at least one group selected from hydrazine groups, hydrazide groups and semicarbazide groups (the group of these functional groups is described as HYD groups), in the molecule, a process for producing the same, aqueous ink compositions for plastic film using the same as binders, aqueous adhesive agents for film lamination and a method of making laminates using said ink and/or adhesives. While the polyurethane resins described in this patent posses better than before physical properties, the extrusion lamination bond strength was still considered to be relatively weak.

SUMMARY OF THE INVENTION

The present invention provides a polyurethane resin having a number average molecular weight of up to 5,000, wherein the resin is prepared by:

(a) reacting a diisocyanate compound with at least one monomer diol compound and optionally a polymer diol compound without a chain extender to form a polymer, wherein the molar ratio of the monomer diol compound over the polymer diol compound when present is above 1; and (b) capping the polymer with a terminator.

The present invention also provides a method for preparing a polyurethane resin comprising:

(a) reacting a diisocyanate compound with at least one monomer diol compound and optionally a polymer diol compound without a chain extender to form a polymer, wherein the molar ratio of the monomer diol compound over the polymer diol compound when present is above 1; and (b) capping the polymer with a terminator.

Other objects and advantages of the present invention will become apparent from the following description and appended claims.

DETAILED DESCRIPTION OF THE INVENTION

It has now been surprisingly found that polyurethane resins of the present invention can be used in laminating inks displaying high lamination bond strength when such resins have a number average molecular weight of up to 5,000 and prepared by reacting an isocyanate compound with at least one monomer diol compound and optionally a polymer dial compound without a chain extender to form a polymer, wherein the molar ratio of the monomer diol compound over the polymer diol compound when present is above 1, followed by capping the polymer with a terminator.

Specifically, when such resins were formulated as the major resin in an aqueous laminating ink, the resultant extrusion lamination bond strengths on a wide variety of plastic films were strikingly superior to those displayed by a similar standard not containing the polyurethane resins of the present invention. These results, particularly on a flexible type of substrate were especially surprising in view of the expected rigidity of the resins.

Preferably, the resin of the present invention have an average molecular weight of about 3,000 to 5,000. Also preferably, the monomer diol compound is preferably dimethylol propionic acid, 2-methyl-1,3-propanediol, chloroglycerol, 1,4-butanediol, 1,6-hexanediol or neopentylglycol. The organic diisocyanate may be any monomeric diisocyanate but is more preferably toluenediisocyanate.

The polymer diol may be one of any available examples but is preferably Terathane 650 or Tone 0200, and the terminator is a C1 to C4 primary alcohol such as propanol, or Abitol, or hydroxylated surfactants such as Igepal C-720.

The following Table 1 illustrates the length of the various diols that can be used in preparing the resins of the present invention:

| Diols Used In Polyurethane Synthesis | | |
|---|---|---|
| Abbr. | Diol Name | #C's in Chain |
| DMPA | Dimethylol propionic acid (monomeric diol) | 3 |
| MPD | 2-methyl-1,3-propanediol (monomeric diol) | 3 |
| CG | Chloroglycerol (monomeric diol) | 3 |
| T650 | Terathane 650 (polymeric diol) | 40 |
| T0200 | Tone 0200 (polymeric diol) | 35 |
| 14BD | 1,4-butanediol (monomeric diol) | 4 |
| 16HD | 1,6-hexanediol (monomeric diol) | 6 |
| NPG | Neopentyl glycol (monomeric diol) | 3 |

Also preferably, the molar ratio of the monomer diol compound over the polymer diol compound when present in the resin of the present invention is above 2. The resin can also have acid number of 0 to about 300, preferably, of about 60 too 140, and more preferably about 120 to 135.

Preferably, the formation of the polymer of the present invention prior to capping (or termination) is carried out in an organic solvent, followed by addition of water and a basic compound and removal of the organic solvent by azeotropic distillation. Preferably, the organic solvent is an aprotic compound having a boiling temperature of about 60 to 140° C., more preferably, methylethylketone. Also preferably, the basic compound is ammonium hydroxide.

EXAMPLE 1

Resin Synthesis

The urethane resins of the present invention were made by first adding the diols (see below for composition) and MEK [methyl ethyl ketone] to a flask, distilling off a few percent of solvent to remove residual water and then cooling to 40° C. The TDI [toluene diisocyanate] was added continually and after the initial exotherm subsided, the mixture was heated to 78–80° C. When the theoretical NCO limit was reached the reaction was quenched with n-propanol. MEK was stripped off until stirring was difficult and then water/ammonia was added slowly. When the temperature reached 100–101° C. the MEK had been removed and the urethane was completely dissolved in water. The resin solids level was 31–33% in water.

The following indicates the diols used in each of polyurethane resins 1–4 and their molar ratio:

Polyurethane Resin Solution 1

[Toluenediisocyanate/Dimethylolpropionicacid(/2-methyl-1,3 Propanediol, Molar Ratio (0.95/0.65/0.20)]

Polyurethane Resin Solution 2

[Toluenediisocyanate/Dimethylolpropionicacid/1,6 Hexanediol, Molar Ratio (0.95/0.65/0.20)]

Polyurethane Resin Solution 3

[Toluenediisocyanate/Dimethylolpropionicacid/1,4 butanediol, Molar Ratio (0.95/0.65/0.20)]

Polyurethane Resin Solution 4

[Toluenediisocyanate/Dimethylolpropionicacid/Terathane 650, Molar Ratio (0.95/0.65/0.20)]

EXAMPLE 2

Procedure For Ink Preparation

White ink was prepared as follows: In a blender jar add resin, water, grind aid, and white pigment were added. The mixture was grinded at high speed 4 minutes or until the grind reaches 0/0 on the grind gauge. Then, surfactants were added as well as water to adjust viscosity to the proper specification.

Colored ink was prepared as follows: The appropriate solvents and defoamers were added to the resin with stirring to make a letdown varnish. The proper amount of pigment dispersion were weighed into a jar. While stirring the pigment dispersion, the appropriate amount of letdown varnish to the jar was added. Water was subsequently added to adjust the ink to the proper viscosity.

EXAMPLE 3

Ink formulation

Water-based laminating inks were prepared by grinding pigment into, or letting down a commercial pigment dispersion with, a varnish made from the above described experimental polyurethane resins. The following tables illustrate the various compositions of experimental Inks 1–5:

TABLE 2

| Ink 1: White water-based laminating ink | |
|---|---|
| Joncryl 62 [S. C. Johnson & Son] | 25 g |
| Water | 32.6 g |
| Tioxide R-HD6X [Tioxide America Corp.] | 90. g |
| Urea | 1.8 g |

TABLE 2-continued

| Ink 1: White water-based laminating ink | |
|---|---|
| [Amco Chemicals LTD] Surfynol CT-136 | 2.0 g |
| [Air Products and Chemicals] Rez 300 | 8.4 g |
| [Sequa Chemicals, Inc.] Polyurethane Resin Solution 1 | 38.0 g |
| Surfynol 104 PA | 2.0 g |
| [Air Products and Chemicals Daypro DF-975 | 0.2 g |
| [Daniels Products Co. Inc.] total | 200.0 g |

Ink 1 was prepared by weighing in a blender jar Joncryl 62 (14 g), water (25.8 g), Tioxide R-HD6X (90 g), urea (1.8 g), and Surfynol CT-136 (2.0 g). The mixture was blended at high speed for 4 minutes. Then, Joncryl 62 (11 g), Rez 300 (8.4 g), experimental polyurethane resin 1 (38 g), Surfynol 104 PA (2 g), Dapro DF-975 (0.2 g), and water (6.8 g) were added. All ingredients were mixed for 15 seconds to make Ink 1.

TABLE 3

| Varnish 1 for the preparation of Ink 2 | |
|---|---|
| Experimental Polyurethane Resin Solution 1 | 81.9 g |
| Water | 14.2 g |
| n-propylalcohol | 2.8 g |
| Surfynol 104 PA [Air Products and Chemicals] | 0.9 g |
| Nalco 2303 [Nalco Chemical Co.] | 0.1 g |
| Daypro DF-975 | 0.1 g |
| total | 100 g |

TABLE 4

| Ink 2: Red water-based laminating ink | |
|---|---|
| BCGFW483019L [Pigment dispersion] | 50 g |
| Varnish 1 | 50 g |
| total | 100 g |

Varnish 1 was made by weighing experimental polyurethane resin solution 1 (81.9 g), water (14.2 g), n-propylalcohol (2.8 g), Surfynol 104PA (0.9 g), 0.1 g Nalco 2303, and Daypro DF-975. The ingredients blended at high speed for 5 minutes. Then, varnish (50 g) was added to red pigment dispersion BCGFW483019L (50 g) to result in Ink 2.

TABLE 5

| Ink 3: White water-based ink | |
|---|---|
| Joncryl 62 [S. C. Johnson & Son] | 25 g |
| Water | 32.6 g |
| Tioxide R-HD6X [Tioxide America Corp.] | 90. g |
| Urea | 1.8 g |

TABLE 5-continued

| Ink 3: White water-based ink | |
|---|---|
| [Amco Chemicals LTD] Surfynol CT-136 | 2. g |
| [Air Products and Chemicals] Rez 300 | 8.4 g |
| [Sequa Chemicals, Inc.] Polyurethane Resin Solution 2 | 38. g |
| Surfynol 104 PA | 2. g |
| [Air Products and Chemicals Daypro DF-975 [Daniels Products | 0.2 g |
| Co. Inc.] total | 200.0 g |

Joncryl 62 (14 g), water (25.8 g), Tioxide R-HD6X (90 g), urea (1.8 g), and Surfynol CT-136 (2 g) were weighed in a blender jar and blended at high speed for 4 minutes. Then, Joncryl 62 (11 g), Rez 300 (8.4 g), experimental polurethane resin solution 2 (38 g), Surfynol 104PA (2 g), Daypro DF-975 (0.2 g), and water (6.8 g) were added and mixed for 15 seconds to result in Ink 3.

TABLE 6

| Ink 4: White water-based ink | |
|---|---|
| Joncryl 62 [S. C. Johnson & Son] | 25 g |
| Water | 35.8 g |
| Tioxide R-HD6X [Tioxide America Corp.] | 90. g |
| Urea [Amco Chemicals LTD] | 1.8 g |
| Surfynol CT-136 [Air Products and Chemicals] | 2. g |
| Rez 300 [Sequa Chemicals, Inc.] | 8.4 g |
| Polyurethane Resin Solution 3 | 38. g |
| Surfynol 104 PA (Air Products and Chemicals | 2. g |
| Daypro DF-975 [Daniels Products Co. Inc.] total | 0.2 g |
| | 203.2 g |

Joncryl 62 (14 g), water (25.8 g), Tioxide R-HD6X (90 g), urea (1.8 g), and Surfynol CT-136 (2 g) were weighed in a blender jar and blended at high speed for 4 minutes. Then, Joncryl 62 (11 g), Rez 300 (8.4 g), experimental polurethane resin solution 3 (38 g), Surfynol 104PA (2 g), Daypro DF-975 (0.2 g), and water (10 g) were added and mixed for 15 seconds to result in Ink 4.

TABLE 7

| Ink 5: White water-based ink | |
|---|---|
| Joncryl 62 [S. C. Johnson & Son] | 25 g |
| Water | 27.8 g |
| Tioxide R-HD6X [Tioxide America Corp.] | 90. g |
| Urea [Amco Chemicals LTD] | 1.8 g |
| Surfynol CT-136 [Air Products and Chemicals] | 2. g |
| Rez 300 [Sequa Chemicals, Inc.] | 8.4 g |
| Polyurethane Resin Solution 4 | 38. g |

TABLE 7-continued

Ink 5: White water-based ink

| | |
|---|---|
| Surfynol 104 PA [Air Products and Chemicals | 2. g |
| Daypro D-975 [Daniels Products Co. Inc.] | 0.2 g |
| total | 195.6 g |

Joncryl 62 (14 g), water (25.8 g), Tioxide R-HD6X (90 g), urea (1.8 g), and Surfynol CT-136 (2 g) were weighed in a blender jar and blended at high speed for 4 minutes. Then, Joncryl 62 (11 g), Rez 300 (8.4 g), experimental polyurethane resin solution 4 (38 g), Surfynol 104PA (2 g), Daypro DF-975 (0.2 g), water (2 g) were added and mixed for 15 seconds to result in Ink 5.

The following table illustrates the composition of standard commercial DPF-427 white (water-based laminating ink):

TABLE 8

Standard Commercial DPF-427 White Ink Formulation (acrylic resin based):

| | |
|---|---|
| Joncryl 2610 [S. C. Johnson & Son] | 50.0 g |
| Water | 29.8 g |
| Tioxide R-HD6X [Tioxide America Corp.] | 90. g |
| Urea [Amco Chemicals LTD] | 1.8 g |
| Lucidene 351 [Morton International] | 7.0 g |
| TV94-5991 [Varnish, Sun Chemical] | 6.0 |
| Surfynol CT-136 [Air Products and Chemicals] | 2.0 g |
| Rez 300 [Sequa Chemicals, Inc.] | 11.0 g |
| Surfynol 104 PA [Air Products and Chemicals | 2.0 g |
| Daypro DF-975 [Daniels Products Co. Inc.] | 0.2 g |
| Nalco 2303 [Nalco Chemical Co.] | 0.2 g |
| total | 200.0 g |

Joncryl 2610 (25 g), water (25.8 g), Tioxide R-HD6X (90 g), urea (1.8 g), and Surfynol CT-136 (2 g) were weighed in a blender jar and blended at high speed for 4 minutes. Then, add Joncryl 2610 (25 g), Rez 300 (11 g), Lucidene 351 (7 g), TV94-5991 (6 g), Surfynol 104 PA (2 g), Dapro DF-975 (0.2 g), Nalco 2303 (0.2 g), and water (4 g) were added and mixed for 15 seconds to result in DPF-427 white ink.

EXAMPLE 4

Ink Testing

Experimental inks were printed side-by-side with the standard ink using a 200-line anilox flexo roller on the appropriate film. Prints were dried for 10 seconds in an 80° C. oven.

For extrusion lamination: Prints were overprinted with a primer using a 360-line anilox roller. The prints were dried for 15 seconds in an 80° C. oven. Extrusion lamination was modeled by placing the appropriate polyethylene film to the print and then running the structure through the hot roll laminator set at 300° F. The structure was then immediately tested for bond strength. The bond strength was determined by pulling apart the laminated structure with the Instron Tensile Tester. This test determines the adhesive and cohesive properties of the laminated inks.

For adhesive lamination: Prints were overprinted using the appropriate adhesive using a 95Q-anilox flexo roller. The prints were dried for 10 seconds in an 80° C. oven. Place the appropriate polyethylene on top of the adhesive and run through the hot roll laminator at 180° F. Allow the laminated structures to sit for 16–24 hours before testing bond strength.

The following tables compare the extrusion bond and adhesive bond strength in grams per linear inch of experimental Inks 1–5 to commercial standard inks when printed on various substrates. Substrates abbreviations are as follows:

PET 1—Terphane 10.21; Rhone Poulenc Acrylic coated polyester;
PET 2—Terphane 10.15; Rhone Poulenc Corona treated polyester;
OPP 1—T523-3; AET Corona treated polypropylene; and
OPP 2—LBW; Mobil Corona treated polypropylene.

TABLE 9

Comparison of Ink 1 with commercial DPF-427 white (water-based laminating ink)

| | DPF-427 | Ink 1 |
|---|---|---|
| Extrusion bond (g/lin-in) | | |
| PET 1 | 45 | 800 |
| PET 2 | 240 | 580 |
| OPP 1 | 470 | 615 |
| OPP 2 | 150 | 125 |
| Adhesive bond (g/lin-in) | | |
| PET 1 | 15 | 70 |
| PET 2 | 15 | 225 |
| OPP 1 | 350 | 105 |
| OPP 2 | 165 | 75 |

TABLE 10

Comparison of Ink 2 with commercial DPF-427 Red (water-based laminating ink)

| | DPF-427 | Ink 2 |
|---|---|---|
| Extrusion bond (g/lin-in) | | |
| PET 1 | 55 | 110 |
| PET 2 | 185 | 260 |
| OPP 1 | 275 | 615 |
| OPP 2 | 390 | 630 |
| Adhesive bond (g/lin-in) | | |
| PET 1 | 30 | 20 |
| PET 2 | 20 | 270 |
| OPP 1 | 260 | 265 |
| OPP 2 | 290 | 330 |

TABLE 11

Comparison of Ink 3 with commercial DPF-427 White (water-based laminating ink)

|  | DPF-427 | Ink 3 |
|---|---|---|
| Extrusion bond (g/lin-in) |  |  |
| PET 1 | 45 | 690 |
| PET 2 | 240 | 685 |
| OPP 1 | 470 | 545 |
| OPP 2 | 150 | 115 |
| Adhesive bond (g/lin-in) |  |  |
| PET 1 | 15 | 60 |
| PET 2 | 15 | 175 |
| OPP 1 | 350 | 140 |
| OPP 2 | 165 | 80 |

TABLE 12

Comparison of Ink 4 with commercial DPF-427 White (water-based laminating ink)

|  | DPF-427 | Ink 4 |
|---|---|---|
| Extrusion bond (g/lin-in) |  |  |
| PET 1 | 45 | 685 |
| PET 2 | 240 | 470 |
| OPP 1 | 470 | 555 |
| OPP 2 | 150 | 110 |
| Adhesive bond (g/lin-in) |  |  |
| PET 1 | 15 | 25 |
| PET 2 | 15 | 160 |
| OPP 1 | 350 | 270 |
| OPP 2 | 165 | 100 |

TABLE 13

Comparison of Ink 5 with commercial DPF-427 White (water-based laminating ink)

|  | DPF-427 | Ink 4 |
|---|---|---|
| Extrusion bond (g/lin-in) |  |  |
| PET 1 | 45 | 460 |
| PET 2 | 240 | 260 |
| OPP 1 | 470 | 580 |
| OPP 2 | 150 | 135 |
| Adhesive bond (g/lin-in) |  |  |
| PET 1 | 15 | 125 |
| PET 2 | 15 | 180 |
| OPP 1 | 350 | 450 |
| OPP 2 | 165 | 165 |

As indicated in Tables 8–12, experimental Inks 1–5 performed better in terms of extrusion and adhesive bond strength than commercial counterparts.

The invention has been described in terms of preferred embodiments thereof, but is more broadly applicable as will be understood by those skilled in the art. The scope of the invention is only limited by the following claims.

What is claimed is:

1. An improved aqueous polyurethane resin, prepared by reacting a diisocyanate compound with a diol and capping the polyurethane resin with a terminator; wherein the improvement comprise: (a) reacting the diisocyanate compound with a monomeric diol and optionally a polyol diol, to thereby form, in the absence of a chain extender, an aqueous polyurethane resin solution having an average number molecular weight of above 400 to about 5000; and (b) capping the polyurethane resin with a terminator.

2. The resin of claim 1 having an average molecular weight of about 3,000 to 5,000.

3. The resin of claim 1, wherein the diisocyanate compound is toluenediisocyanate.

4. The resin of claim 1, wherein the monomer diol compound is selected from the group consisting of dimethylolpropionic acid, 2-methyl-1,3-propanediol, chloroglycerol, 1,4-butanediol, 1,6-hexanediol, neopentylglycol and dimethylolbutanoic acid.

5. The resin of claim 1, wherein the polymer diol compound is selected from the group consisting of polyester and polyether diols.

6. The resin of claim 1, wherein the terminator is selected from the group consisting of C1 to C4 primary alcohol, abitol, and hydroxylated surfactants.

7. The resin of claim 6, wherein the alcohol is propanol.

8. The resin of claim 1, wherein the molar ratio of the monomer diol compound over the polymer diol compound when present is above 2.

9. The resin of claim 1 having an acid number of about 60 to 140.

10. The resin of claim 1 having an acid number of about 120 to 135.

11. The resin of claim 1, wherein step (a) is carried out in an organic solvent followed by addition of water and a basic compound and removal of the organic solvent by azeotropic distillation.

12. The resin of claim 11, wherein the organic solvent is an aprotic compound having a boiling temperature of about 60 to 140° C.

13. The resin of claim 11, wherein the organic solvent is methylethylketone.

14. The resin of claim 11, wherein the basic compound is ammonium hydroxide.

15. An improved method for preparing an aqueous polyurethane resin by reacting, in solvent, a diisocyanate compound with a diol, capping the polyurethane resin with a terminator, and removing the solvent, wherein the improvement comprises:

(a) reacting the diisocyanate compound with at least one monomer diol compound and optionally a polyol diol compound, in the absence of a chain extender, to thereby form an aqueous polyurethane resin solution having an average number molecular weight of above 400 to about 5000; and (b) capping capping the polyurethane resin with a terminator.

16. The method of claim 15, wherein the resin has an average molecular weight of about 3,000 to 5,000.

17. The method of claim 15, wherein the diisocyanate compound is toluenediisocyanate.

18. The method of claim 15, wherein the monomer diol compound is selected from the group consisting of dimethylolpropionic acid, 2-methyl-1,3-propanediol, chloroglycerol, 1,4-butanediol, 1,6-hexanediol, neopentylglycol and dimethylolbutanoic acid.

19. The method of claim 15, wherein the polymer diol compound is selected from the group consisting of polyester and polyether diols.

20. The method of claim 15, wherein the terminator is selected from the group consisting of C1 to C4 primary alcohol, abitol, and hydroxylated surfactants.

21. The method of claim 20, wherein the alcohol is propanol.

22. The method of claim 15, wherein the molar ratio of the monomer diol compound over the polymer diol compound when present is above 2.

23. The method of claim 18, wherein the resin has an acid number of about 60 to 140.

24. The method of claim 18, wherein the resin has an acid number of about 120 to 135.

25. The method of claim 15, wherein step (a) is carried out in an organic solvent followed by addition of water and a basic compound and removal of the organic solvent by azeotropic distillation.

26. The method of claim 25, wherein the organic solvent is an aprotic compound having a boiling temperature of about 60 to 140° C.

27. The method of claim 25, wherein the organic solvent is methylethylketone.

28. The method of claim 25, wherein the basic compound is ammonium hydroxide.

29. A laminating ink comprising:

a) a colorant; and b) an aqueous polyurethane resin solution having a number average molecular weight of above 400 to about 5000 prepared by reacting a diisocyanate compound and monomeric diol and optionally a polyol diol in the absence of a chain extender, and capping the polyurethane resin with a terminator.

* * * * *

UNITED STATES PATENT AND TRADEMARK OFFICE
CERTIFICATE OF CORRECTION

PATENT NO. : 6,624,240 B2  Page 1 of 1
DATED : September 23, 2003
INVENTOR(S) : Auerbach It is certified that error appears in the above-identified patent and that said Letters Patent is hereby corrected as shown below:

<u>Title page,</u>
Item [12], "Auerbach" should read as follows: -- Auerbach et al. --
Item [75], Inventors, please add the following inventors: -- David Klein, Wayne, NJ (US); William P. Keaveney, Pompton Plains, NJ (US) --

Signed and Sealed this

Twentieth Day of January, 2004

JON W. DUDAS
*Acting Director of the United States Patent and Trademark Office*